March 13, 1951     G. ANDERSON     2,545,013
SAFETY DEVICE FOR MACHINE OPERATORS
Filed Feb. 18, 1946     2 Sheets-Sheet 1
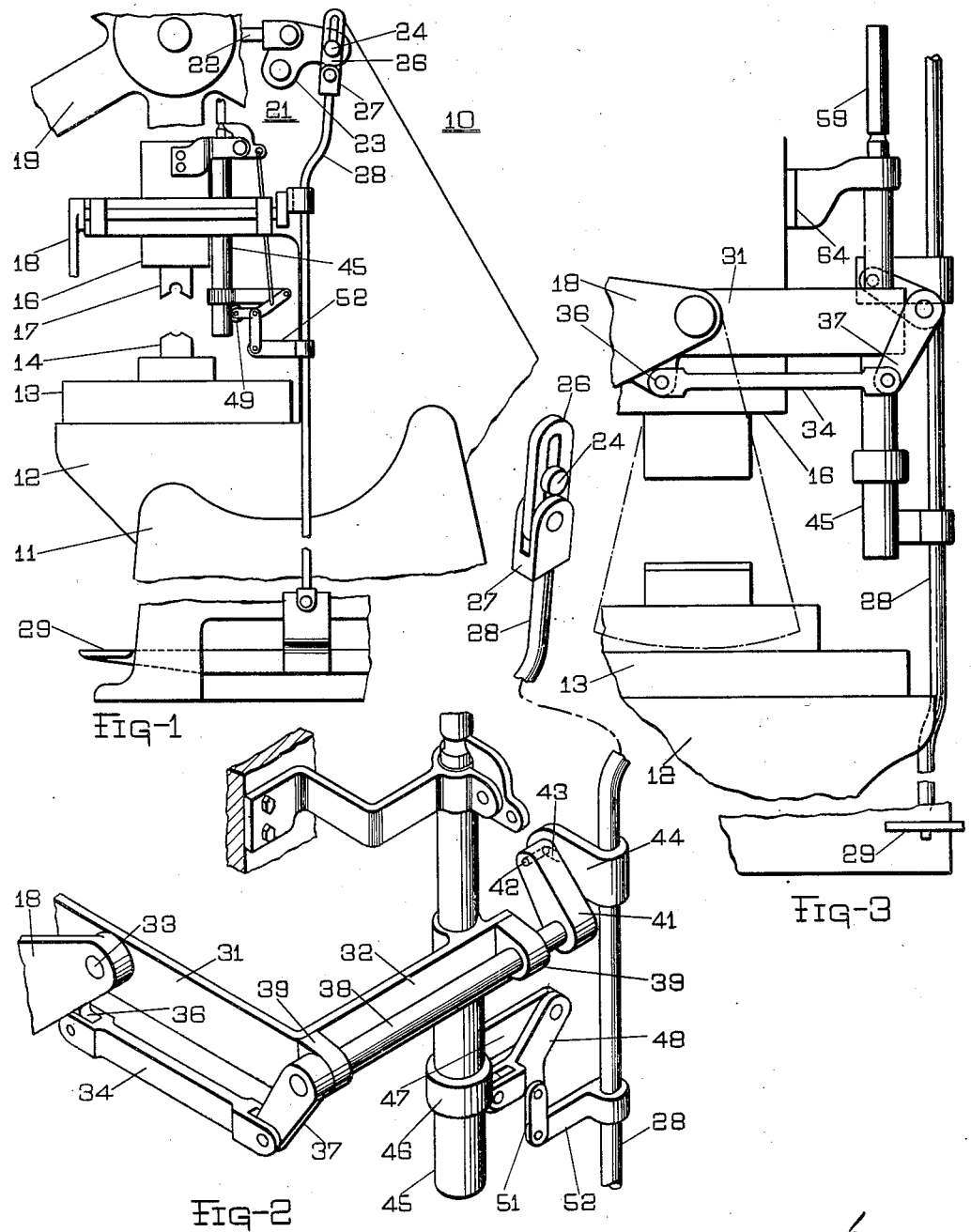
Inventor
George Anderson
By Richmond S. Hayes
Attorney March 13, 1951  G. ANDERSON  2,545,013
SAFETY DEVICE FOR MACHINE OPERATORS
Filed Feb. 18, 1946  2 Sheets-Sheet 2
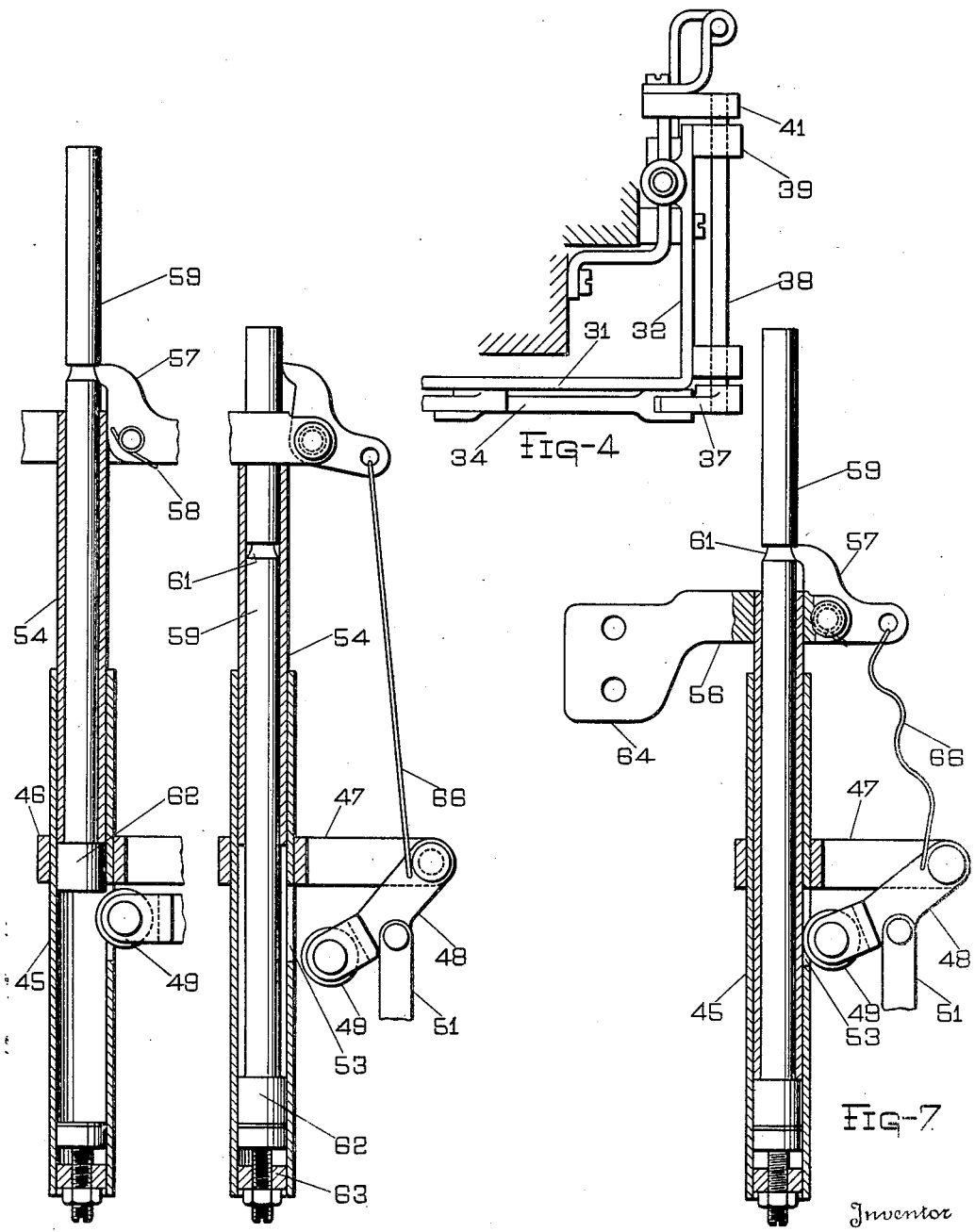

Patented Mar. 13, 1951

2,545,013

UNITED STATES PATENT OFFICE 2,545,013

SAFETY DEVICE FOR MACHINE OPERATORS

George Anderson, Jamestown, N. Y., assignor to Jamestown Safety Guard Corporation, Jamestown, N. Y., a corporation of New York Application February 18, 1946, Serial No. 648,435

8 Claims. (Cl. 74—616)

This invention relates to improvements in safety devices for use on many types of machines for the protection of the hands and arms of operators thereof.

There are many types of machines which require an operator to insert a work piece, actuate the machine mechanism, and then remove the completed piece. Generally, these machines are of the press or shear type which suggests that they are frequently operated in rapid succession. To avoid the danger of injury or mutilation of the hands or the arms of an operator, such machines should be provided with some protective device. Some machines of this type are equipped with some form of operator safety device that includes a guard, movable, during machine operation, into a position to prevent operator access to the dies or shears of the machine. These guards may take the form of a shield, swinging arm, basket, etc. Of course, such devices are only capable of protecting the hands and arms of an operator from injury if they function in properly timed sequence with operation of the machines to which they are applied. Generally speaking, it is better to provide no guard at all than to furnish a machine with a guard that does not function to prevent operator access to the dies or shears when the machine is operating.

The present invention has for one of its objects the provision of an operator guard or shield with means for properly coordinating its operation with the operating mechanism of the machine to which it is applied. Another object of the invention lies in the provision of a mechanism that requires a guard, in the form of a shield or other interceptor, to first assume its position of blocking operator access to the operative parts of the machine before the machine mechanism may be tripped or otherwise set in motion. Another object of the invention lies in the provision of a mechanism that requires a guard or other interceptor to move into operative or access blocking position when the machine mechanism starts functioning, even though such functioning is due to improper operation of the machine latch, and out of control of the machine operator. Another and most important object of the invention lies in the provision of a mechanism that requires a guard or other interceptor to remain in operative or access blocking position during the entire time the machine is operating, even though such a machine repeats a cycle of operation with or without the machine operator's assistance.

Other objects and advantages of the invention will be more fully understood from a consideration of the following specification, taken in conjunction with the accompanying drawings; and in which Fig. 1 is a fragmentary side elevational view of a substantial portion of a conventional punch press to which is applied an operator guard, together with one form of the mechanism of the invention for controlling press and guard operation;

Fig. 2 is a fragmentary perspective view of the guard operator and press control structure;

Fig. 3 is an enlarged fragmentary front elevational view of a press embodying the form of the invention shown, the operative position of the guard being shown in dotted lines;

Fig. 4 is a fragmentary top plan view of a portion of the control mechanism shown in Fig. 3;

Fig. 5 is a fragmentary view, partly in section, of the guard control means in inoperative position;

Fig. 6 is a more detailed view of the structure of Fig. 5, showing the position of the parts when the guard is in operative position; and Fig. 7 is a further view of the structure of Fig. 5, showing the position of the parts when the guard is in operative position and the ram of the press has moved to the bottom of its stroke.

The invention is shown applied to a conventional punch press that is fitted within an operator guard or shield of such proportions as to constitute a complete access barrier to certain of the operative parts of the press when these parts are in, or approaching, an operative position. The press, generally indicated by the reference numeral 10, may include a conventional pedestal or base 11, on an upper portion 12 of which is located a suitable table or die mount 13. For purposes of illustration, it is mentioned that the table 13 mounts a die element 14 and that the operative member or reciprocal ram 16 of the press mounts a further die element 17. The area at the front of the press, adjacent elements 14 and 17, is adapted to be closed off or shielded by a guard 18 when the operating mechanism 19 causes the ram to descend and bring the die elements into operating position. Of course, all presses are equipped with one form or another of means for controlling their operation and, in the present instance, applicant shows what is believed to be a conventional latch structure 21. This latch includes a pin 22 which, when moved to inoperative position against tension of a suitable spring, permits one complete revolution of the operating mechanism and one complete reciprocation of the ram 16. Withdrawal of the pin of the latch may be effected through a bellcrank 23, to which a link 26 is connected, through a pin 24. The other end of this link is pivotally joined to a yoke 27, attached to one end of a rod 28. As will be hereinafter more fully described, this rod is adapted to extend more or less vertically along one side of the machine and connect with an arm or lever on which is mounted a pedal 29. This pedal, of course, is adjacent the front of the machine, conveniently accessible to the foot of the machine operator.

Attached, in any suitable manner, to a fixed frontal portion of the press, is a plate 31. Another plate 32, or an integral portion of the plate previously mentioned, extends rearwardly of and along one side of the press. Mounted on the plate 31, in alignment with the die elements 14 and 17, is a pivot 33 which mounts the guard 18 in a manner to allow swinging movement thereof into position before the die elements. One end of a link 34 is pivotally joined to the guard 18, as at 36. The other end of this link is pivotally joined to one end of an arm 37. The other end of arm 37 is mounted on one end of a rod 38. This rod is supported in a pair of bearings 39, carried by the plate 32. The other end of rod 38 mounts one end of a further arm 41. The other end of this arm is provided with a pin or stud 42 which extends into a slot 43 of a bar 44 attached to the rod 28. It is evident from the foregoing that when the pedal 29 is depressed and moves rod 28 downwardly, arm 41 will be rotated and, through shaft 38, arm 37 will also rotate to swing the guard 18 from its full to dotted line position in Fig. 3. Any conventional spring means (not shown) may be provided to return the guard 18 to inoperative position once the pedal 29 has been released.

A tube 45 is adapted to be secured in an upright position to a fixed portion of the side of the press. To this tube, adjacent its lower end, is attached a collar 46, having an extension 47 that pivotally mounts one end of an arm 48. The other end of this arm mounts a roller 49. Intermediate its pivotal support and the roller, this arm provides pivotal connection for one end of a link 51, the other end of this link being pivotally joined to a bracket 52 that is fixed to the shaft 28. Directly below the collar 46, the tube 45 is provided with a slot or opening 53, this opening being of a size and location to permit the roller 49, and possibly a portion of the free end of arm 48, to move into the interior of the tube under certain conditions of operation of the mechanism.

Within the tube 45 is located a sleeve 54. This sleeve is movable within certain restrictions in and out of the tube 45 and, at its upper end, that at all times projects beyond the upper end of the tube, there is mounted a bracket 56 which is intended to carry a latch 57 normally movable into operative position by a spring 58. Mounted in the sleeve 54 is a rod 59. Near the upper end of this rod is an annular groove 61 that provides a shoulder with which the latch 57 is engageable (see Fig. 7). The other end of the rod 59 projects beyond the lower end of the sleeve 54, being fitted with an enlarged end 62, the diameter of which is only slightly less than the interior diameter of the tube 45. The lower end of the tube 45 is closed by a stop 63 which may be of a design to be both removable and adjustable. It will be noted that the bracket 56 that serves to mount the latch 57 includes a laterally extending arm 64 that is attached to the ram 16 in order that, as the ram reciprocates, sleeve 54 will also reciprocate.

To more fully bring out the novelty of the invention, a description of the operation of the parts is set forth. It may be assumed that a press operator has presented himself to the machine when the parts are in the position best shown in Figs. 1, 2, and 3, and that a work piece has been placed upon the die element 14. The operator depresses pedal 29 and, during movement of this pedal from raised to fully depressed position, the following sequence of movement takes place. The rod 28 moves downwardly and, through arm 41, shaft 38, etc., the guard 18 is caused to move from inoperative to operative position. Thus the work piece, now resting on the die element 14, is not readily accessible to the operator. During the extent of movement of the rod 28 which has caused the guard to swing into operative position, arm 48 has been swung to a position such that roller 49 has been withdrawn from the slot 53 in tube 45. Continued downward movement of the rod 28 swings arm 48 still further (compare Figs. 7 and 6) and, due to the connection 66 between the arm and latch 57, said latch is actuated, being withdrawn from the groove 61, and rod 59 drops downwardly of the sleeve 54 to a point where the end 62 contacts stop 63. During movement of the rod 28 to the extent described, the link 26, at the rod's upper end, has moved to a point such that the pin 24, carried by the bellcrank 23, is now at the upper end of the slot. In other words, this lost-motion first permits movement of the parts described, and now, as rod 28 continues to its lowermost position, bellcrank 23 is rotated to an extent to withdraw pin 22 of the latch 21 to an inoperative position. When this pin has been withdrawn, the press is set in motion and ram 16 moves downwardly to such a position that the die elements perform the desired operation on a work piece.

As the ram 16 of the press descends, bracket 56 causes the sleeve 54 to move downwardly to the position shown in Fig. 7, and as ram and sleeve reach the bottom of their stroke, latch 57, urged by spring 58, enters the groove 61, thus again locking sleeve 54 and rod 59 together. The ram 16, having completed its downward movement, again moves upwardly and in so doing raises or returns sleeve 54 and rod 59 to the position shown in Fig. 5. Particular attention is directed to the fact that the guard 18, upon the release of pedal 29, does not return to inoperative position. The reason for this is apparent from an examination of Fig. 7 of the drawing where it will be noted that when sleeve 54 and rod 59 are in their lowermost position, they fill this portion of the tube 45 and, since arm 48 cannot swing to an extent to project roller 49 into the tube sufficiently to allow the necessary upward movement of rod 28, the guard 18 cannot return to inoperative position.

With many press operators it is a more or less common habit to ride the operating pedal and in so doing the operator may, without realizing it, hold the pedal down sufficiently to prevent the press latch mechanism from functioning upon the completion of a single cycle of operation. In other words, just when the operator is preparing to remove a finished work piece, or has removed such a piece and is inserting an unfinished one, the ram descends and the operator's hand is injured. The structure of the present invention eliminates the possibility of such an accident by causing the guard 18 to remain in operator blocking position unless the pedal 29 is permitted to return fully to its inoperative position. As was brought out above, the first downward movement of the pedal 29 and rod 28 moves the guard 18 into operative position and, once the guard has assumed this operative position, it cannot move out of it until the sleeve 54 and rod 29 have moved upwardly of the tube 45 to the position shown in Fig. 5. Once these parts have cleared the lower portion of the tube, arm 48 may swing to a position such that the roller 49 enters the tube and, since this arm is directly operable with rod 28 and guard 18, the guard may, only under these conditions, return to inoperative position.

It is to be particularly noted that the press may not be actuated while an operator is inserting or removing a work piece, for the reason that, should the operator, or some other person adjacent the press, attempt to depress the pedal 29, the first function is to swing guard 18 into operative position. Thus, if the operator's hand or arm obstructs or prevents movement of the guard into operative position, the pedal 29 may not be depressed sufficiently to actuate the latch 21. However, if sufficient force is applied to the pedal 29 and an operator's hand or arm chances to be in the path of travel of the guard, the guard will knock the operator's hand out of the danger zone, and only after this takes place, and the guard assumes operative position, can the press latch be released.

The foregoing description of the ability of the guard and its operating mechanism to either block operator access to the moving parts of the machine, or remove the operator's hands from the danger zone, presupposes that the operator, or some associate, has either pressed down or held down the control pedal 29. However, the present invention is peculiarly adapted to provide additional operator safety in preventing operator access to the moving parts of the machine, should any defect occur in the latch or other control of the ram operating mechanism. In view of the fact that the guard 18 has positive operative connection with arm 48, it is evident that the guard will move into or out of operative position as the arm 48 may be caused to move into or out of the positions in Figs. 5 or 6. It may be assumed that an operator has completed a given piece of work, released pedal 29, and thus allowed withdrawal of guard 18 from before the die elements. The operator is now about to insert his hand to remove the finished work piece. However, at this point the latch 21 for the ram breaks down or fails to hold. This allows the ram to immediately again descend and the operator's hand may be beneath the descending die or about to enter this space. Since the sleeve 54 is directly joined to the ram 16, it will move downwardly of tube 45 with the speed of the ram and the end 62 of rod 59 will not only contact roller 49, but will swing arm 48 from the position shown in Fig. 5 to that of Fig. 7. As heretofore brought out, arm 48, being directly linked with the guard 18, thus rapidly moves the guard into operative position. Of course, the rapidity with which the guard 18, under these conditions, moves into operative position is determined by the rapidity of descent of the ram, and the operator's hand will be forced, by the sweeping movement of the guard, out of the danger zone. It will be understood that even under these circumstances the guard reaches its full operative position before the die elements can contact, by reason of the location of the roller 49. In other words, during the first part of the descent of the ram, the guard is actuated through movement of arm 48 due to the proximity of roller 49 to the end 62 of the rod 59. The present invention therefore is capable, under all circumstances, of moving a guard or other interceptor into operative position to either block operator access to the danger zone of a press, or remove an operator's hand from such danger zone sufficiently prior to movement of the operative parts of the machine into operative position.

Although applicant has shown and described only one modification of his invention applied to a punch press, it will be apparent that modifications of this structure may be made and are contemplated, in connection with the use of the invention on other types of presses or shears, insofar as such modifications are within the scope of the invention as set out in the annexed claims.

Having thus set forth my invention what I claim as new and for which I desire protection by Letters Patent is:

1. In a machine of the class described, an operative member, latch means normally rendering said member inoperative, a work receiving area, a guard mounted to move into an operative position with respect to said area, operator actuatable means for moving said guard into operative position, means operably associating said operator actuatable means with said latch means, other means operable by said operator actuatable means to secure said guard in operative position, and further means effective to release said guard for return to inoperative position only when said member reaches an inoperative position and effective upon any subsequent movement of said member to return said guard to operative position.

2. In a machine of the class described, an operative member, latch means normally rendering said member inoperative, a work receiving area, a guard mounted to move into an operative position with respect to said area, operator actuatable means for moving said guard into operative position, mechanism for controlling operation of said guard and said latch means comprising a fixed element, another element associated with said fixed element and attached to said operative member, means, actuatable by movement of said guard into operative position, to render said other element movable with said operative member, and other means connecting said actuatable means with said latch means.

3. In a machine of the class described, an operative member, latch means normally rendering said member inoperative, a work receiving area, a guard mounted to move into an operative position with respect to said area, operator actuatable means for moving said guard into operative position, mechanism for controlling operation of said guard and said latch means, comprising telescoping elements carried on a fixed portion of said machine, one of said elements being operably associated with said operative member, means normally securing said elements against relative movement, other means operable, upon movement of said actuatable means, to release said elements for relative movement, when said actuatable means has moved said guard into operative position.

4. In a machine of the class described, an operative member, latch means normally rendering said member inoperative, a work receiving area, a single guard mounted to move into an operative position with respect to said area, operator actuatable means for moving said guard into operative position, mechanism for controlling operation of said latch means, and other means for effecting movement of said guard into operative position upon movement of said operative member.

5. In a machine of the class described, a latch controlled operative member, a work receiving area, a guard mounted to move into an operative position with respect to said area, and means operatively associating said guard with said member to effect movement of said guard into operative position upon initial movement of said operative member and hold said guard in such operative position during balance of movement of said operative member.

6. In a machine of the class described, a reciprocable member, latch means normally rendering said member inoperative, a work receiving area, a guard mounted to move into an operative position with respect to said area, operator actuatable means normally operable to successively move said guard into operative position and actuate said latch means to render said member operative, and other means operable, on initial movement of said member, to effect movement of said actuatable means to an extent to move said guard into operative position.

7. In a machine of the class described, a reciprocable ram, a work receiving area, a guard mounted to move into an operative position with respect to said area, and means operatively associating said guard with said ram so as to be moved by said ram and in such manner as to move said guard into and hold it in full operative position upon initial and throughout complete movement of said ram.

8. In a machine of the class described, a reciprocable ram, a work receiving area, a single guard mounted to move into an operative position with respect to said area, operator actuatable means for moving said guard into said operative position, and other means operable by initial movement of said ram, serving to prevent movement of said operator actuatable means in a manner and to an extent to move said guard to inoperative position while said ram is reciprocating.

GEORGE ANDERSON.

REFERENCES CITED

The following references are of record in the file of this patent:

UNITED STATES PATENTS

| Number | Name | Date |
|---|---|---|
| 618,064 | Dicks | Jan. 24, 1899 |
| 1,155,745 | Levi | Oct. 5, 1915 |
| 1,169,684 | Sheff | Jan. 25, 1916 |
| 1,172,394 | Roth | Feb. 22, 1916 |
| 1,172,769 | D'Arcy et al. | Feb. 22, 1916 |
| 1,258,525 | Beyer | Mar. 5, 1918 |
| 1,648,232 | Ischinger | Nov. 8, 1927 |